United States Patent [19]

Buck

[11] 3,903,055

[45] Sept. 2, 1975

[54] METHOD FOR INITIATING POLYMERIZATION OF CYANOACRYLATE MONOMERS AND COMONOMER BLENDS THEREOF TO GIVE REPRODUCIBLE AND PREDETERMINED GEL/TRANSITION TIME CHARACTERISTICS

[75] Inventor: Carl J. Buck, Berkeley Heights, N.J.

[73] Assignee: Johnson & Johnson, New Brunswick, N.J.

[22] Filed: Dec. 5, 1973

[21] Appl. No.: 422,047

Related U.S. Application Data

[63] Continuation-in-part of Ser. No. 317,497, Dec. 21, 1972, abandoned.

[52] U.S. Cl. .............................. 260/78.4 N; 106/35
[51] Int. Cl. .......................... C08f 3/74; C08g 33/02
[58] Field of Search ................................ 260/78.4 N

[56] References Cited

UNITED STATES PATENTS

| | | | |
|---|---|---|---|
| 3,260,637 | 7/1966 | von Bramer et al. | 260/78.4 |
| 3,347,798 | 10/1967 | Baer et al. | 252/448 |
| 3,594,358 | 7/1971 | Moberly | 260/92.8 |

*Primary Examiner*—Joseph L. Schofer
*Assistant Examiner*—Maria S. Tungol

[57] ABSTRACT

A method is disclosed for initiating the polymerization of small amounts of relatively sensitive liquid monomer compositions, comprising esters of cyanoacrylic acid, by means of a polymerization catalyzing particle adapted to be added to the monomer composition and then separated from the same prior to gelation of the monomer. The catalyzing particle may be in the form of a discrete particle such as beads, chips, or the like, or in the form of a rod sufficiently long so that the same can be used to simultaneously stir and activate the monomer.

9 Claims, No Drawings

3,903,055

METHOD FOR INITIATING POLYMERIZATION OF CYANOACRYLATE MONOMERS AND COMONOMER BLENDS THEREOF TO GIVE REPRODUCIBLE AND PREDETERMINED GEL/TRANSITION TIME CHARACTERISTICS

The present application is a continuation-in-part of copending application Ser. No. 317,497 filed Dec. 21, 1972 (now abandoned).

DISCLOSURE OF THE INVENTION

This invention relates to a method for obtaining reproducible gel/transition times upon polymerization of a composition comprising an ester of 2-cyanoacrylic acid. More particularly, this invention relates to obtaining reproducible gel/transition times for small amounts of such compositions with a high degree of precision by means of introducing any one of a particular class of amine catalysts into the monomer in a controlled manner. The invention especially relates to methods of performing such polymerization through the use of new and novel catalyzing particles.

In dentistry, the use of polymeric materials in dental restorative composites and in filled and unfilled pits and fissure sealant formulations is gaining increasing acceptance. The polymeric compositions based on the phenyl, cyclohexyl, and $C_1$ to $C_{16}$ alkyl 2-cyanoacrylates have potential use as pits and fissure sealants for caries prevention and in a variety of adhesive applications where the quick-setting properties of the cyanoacrylate monomers are used to advantage.

The cyanoacrylate monomers are inherently relatively unstable, tending to polymerize on standing in the presence of moisture alone. As a result, it is the practice to introduce into the monomer acidic stabilizers such as sulfur dioxide ($SO_2$). Where too much stabilizer is present, the monomer may be too sluggish to give the rapid set times desired. Accordingly, for dental applications, a lower degree of stabilization is generally desired, with the $SO_2$ content preferably being below about 100 parts per million (ppm). When polymerizing such a relatively sensitive liquid monomer, an amine catalyst may be employed. The amine catalyst acts to both neutralize part of the acidic inhibitor and to function as an anionic initiator for the polymerization of the cyanoacrylate monomer.

Where used by the dentist, the cyanoacrylate monomer is used in relatively small amounts, with approximately only about five drops of the cyanoacrylate monomer, for example, being sufficient to treat four molars where the monomer is used as a pit and fissure sealant. This raises a real problem with respect to the practical catalysis of such small volumes of monomers just prior to use.

The catalysis, or initiation, of the polymerization of the esters of 2-cyanoacrylic acid requires only a trace or small amount of the amine catalyst. For most dental applications, catalysis must be effected in such a manner as to delay the ultimate gelation or polymerization of the monomeric composition long enough to allow placement on tooth structures. The addition of the exceedingly small amounts of catalyst required for the controlled polymerization is most difficult. For example, direct introduction of a small amount of pure catalyst into the monomer can result in a runaway, or instantaneous, polymerization due to inadvertent addition of excess catalyst. Attempts to add the catalyst dropwise, where in liquid form, are unseccessful because of the large amount of catalyst so introduced proportional to the few drops of monomer to which the catalyst is being added. Conventional approaches to further reduce the amount of catalyst, such as by dipping a glass stirring rod into the liquid catalyst and then stirring the monomer with the wetted end of the rod or by use of small capillary pipettes, also are unsatisfactory. The result is generally an erratic polymerization. Frequently, the monomer is found to rapidly catalyze around the wetted end of the catalyst-dipped rod or the end of the pipette, encapsulating the same and thereby preventing an even, gradual distribution of the catalyst throughout the monomer and, thereby, giving rise to highly variable polymerization times. At other times immediate polymerization is obtained.

Very small amounts of catalyst may be added together with a diluent. The choice of a suitable diluent is not, however, simple or most desirable. Incorporation of the catalyst in a solvent tends to weaken the mechanical strength properties of the resultant polymer and may affect its adhesion to the surface applied. Also, inclusion of a liquid diluent leads to the formation of entrapped solvent bubbles in the polymeric mass as the solvent is volatilized. This affects the uniformity of the cyanoacrylate polymer coating with adverse effects on its strength, wear, adhesion, and aesthetic qualities.

The above illustrates the difficulty in obtaining controlled polymerization of small volumes of monomeric cyanoacrylates. However, control of the polymerization time is, for many applications, extremely important. This is particularly true in dental applications where the time interval between activation and gelation is of substantial practical importance, particularly as the cyanoacrylate monomers are individually catalyzed for each application. Once catalyzed and after the gelation stage has been reached, the composition increases in viscosity to a point where it can no longer be worked or applied evenly to teeth. The gelation stage is followed by an extremely rapid transition to a hard, polymeric mass. In this specification, the term "gel time" is defined as the elapsed time from addition of the catalyzing particle to the gelation point, while the term "transition time" is defined as the elapsed time between gelation and a hard set. For pits and fissure sealant formulations, gel times of 1–2 minutes and transition times of 5–15 seconds are frequently desired. The term "set time" in this specification is the total time, i.e., gel time plus transition time, required to obtain a hard, polymerized mass.

In dental uses, it is the general procedure to prepare the monomer and add the catalyst thereto only after the patient's teeth have been isolated and prepared. Even then, it is necessary for the practitioner to have the utmost confidence that once being catalyzed, the composition comprising the cyanoacrylate monomer or blends thereof will remain in the fluid, nonpolymerized state for a time sufficient for him to apply it to the prepared tooth surface, work it into place, and remove any excess prior to gelation. In order that this may be accomplished, the practitioner should know that gelation will not occur before some predetermined time. It is equally important that once the procedure has been completed and the catalyzed monomer applied to teeth, gelation and hardening will occur reasonably soon thereafter so as to minimize treatment time for both the dentist and patient.

Therefore, the primary object of this invention is to provide a method for the controlled catalysis and polymerization of small amounts of 2-cyanoacrylate monomers and their derivatives in order to achieve predetermined and reproducible gel/transition times.

A still further object of this invention is to provide a means for the controlled polymerization of small amounts of 2-cyanoacrylate monomer blends that employ no filler.

Another object of this invention is to provide a means for accurately obtaining predictable gel and transition times for cyanoacrylate monomer compositions, in small amounts, containing finely divided inert fillers.

These and other objects, which will become apparent to one skilled in the art upon reading this disclosure, are accomplished by providing a carrier having a porous surface, such as a molecular sieve material, balsa wood, and the like, in uniformly sized particles, the porous surfaces of which are loaded with a polymerization catalyst of the type described. Such carrier, with catalyst, is herein referred to as a "catalyzing particle." Suitable monomers with which such catalyzing particles may be used include those of the esters of 2-cyanoacrylic acid, especially phenyl, cyclohexyl, and $C_1$ to $C_{16}$ alkyl 2-cyanoacrylate monomers.

As carriers, any solid porous material substantially inert to the amine catalyst or cyanoacrylate monomer may be used. Examples of such carriers are molecular sieves, clay plate chips, nonglazed ceramic chips, microporous boiling chips (believed to be anthracite), wood of various varieties such as balsa, birch, and the like, and activated carbon granules. The carrier may be in the form of relatively small particles which would be completely immersed, when used, in the monomer, or in the form of rods with only one end being immersed in the monomer, with the rod being used for stirring as well as activation. Where wood is used as the carrier, the rod form is preferred. In such case only the end adapted to be immersed in the monomer need be treated with the amine.

In initiating polymerization, a selected number, such as one or more, catalyzing particles are placed in the cyanoacrylate monomer, and the monomer with catalyzing particle is agitated for a brief period of about 5 to 30 seconds. Agitation beyond 30 seconds appears to have little additional effect. The catalyst particle is then separated from the monomer while the same is still liquid and prior to gelation. Shortly thereafter gelation occurs followed by complete polymerization. In this way small amounts of monomeric esters of cyanoacrylic acid can be activated, and the reproducibility of the elapsed time from activation to gelation can be controlled to within slightly less than a minute. The actual time period thus is within the user's control and can be anywhere from 1 to 10 minutes, whatever working time is preferred or required for the application in mind.

In practicing the present invention, the carrier particles used should be substantially uniform in size and uniformly treated with the amine catalyst for any standardization followed by monomer use. The catalyzing particle should have a size of about 4 to 16 mesh, with the preferred size generally being within the range of about 6 to 10 mesh. Where the catalyzing particle is in rod form, the diameter of the rod should preferably also be in this size range. The size should be sufficiently large such that a single particle can be easily handled and used. It should also be sufficiently small that over-catalysis does not occur when a single catalyzing particle is added to about four or five drops of monomer. Control of the gel time of the cyanoacrylate monomer is exercised by the dentist or other user by means of the number of catalyst carrier particles used.

Molecular sieve pellets, which are the preferred carriers, will be used in illustrating the practice of the invention. Briefly, in carrying out the polymerization method of this invention, a quantity of monomer is measured into a suitable container and one or more of the catalyst treated molecular sieve pellets is introduced. The catalyzing particle is agitated in the monomer to allow time for diffusion of an adequate quantity of catalyst from the pellet into the monomer. After a measured time, the catalyzing particle is removed from contact with the monomer. This may be done either by removing the catalyst particles individually or by decanting off the activated monomer. A short time after introduction and removal of the catalyzing particles, gelation and setting occurs. Further standardization runs may be repeated using a similar increment of monomer, a like number and size of catalyst particles, and a substantially identical period of agitation and contact of the catalyst particles with the monomer to obtain an average standard value for the gel time. Having now established the gelation/set time characteristics under a fixed set of conditions and a sufficient degree of precision, one can utilize monomeric compositions thus catalyzed in dental applications with the assurance that polymerization will take place within a specific time interval, such being sufficiently long to permit application to teeth without fear of premature polymerization.

Molecular sieve materials are available from the Union Carbide Corporation, New York, N.Y., and comprise sodium aluminosilicates of the general formula, $Na_2O: Al_2O_3:2—3SiO_2$. The molecular sieve materials which are most useful in the practice of this invention have nominal pore diameters in the range of about 4–10 Angstroms (A). One of the preferred is the so-called Type 13X having a nominal pore diameter of 10A. Molecular sieves are produced in the form of powders, pellets, and beads; with the molecular sieve bead form being the preferred particulate carrier for introducing catalyst into the monomer.

The catalyst can be loaded upon a molecular sieve material in the powder stage by admixing the molecular sieve powder with catalyst and then pelletizing by known techniques into the shape desired, either beads or pellets. These can then be sized.

Alternatively, the molecular sieve material can be converted into the pellet or bead form and then loaded with catalysts by immersion in a solvent containing the catalyst or, if the catalyst is a liquid, by immersion in the liquid catalyst itself until the porous molecular sieve material has acquired the desired amount.

The quantity of catalyst carried by an individual batch of beads is not critical, except that generally the higher the concentration of catalyst the faster the polymerization reaction rate. However, it is important that all pellets or beads within a sized batch carry approximately the same quantity of catalyst so that a standardized gelation time and set time behavior can be established for that batch.

In carrying out the invention, one or more catalyzing particles, preferably a pellet in the shape of a bead carrying N,N-dimethyl-p-toluidine catalyst, is introduced into a premeasured quantity of monomer such, for example, as isobutyl cyanoacrylate. The catalyzing particle is agitated for a few seconds in the monomer mixture, during which time a small but effective amount of the catalyst passes into the monomer. The manner of passing is not known, it may be leached from or diffused from the carrier. However, regardless of how it enters the monomer, encapsulation is avoided and uniform activation occurs with delayed gelation followed by polymerization to a hard mass. At any time after removal of the catalyzing particle and prior to gelation, the monomer may be applied to the object to which it is to be bonded.

As previously indicated, although many materials are available which will catalyze the polymerization of cyanoacrylate monomers, there are relatively few materials that can be used in preparing the catalyzing particles used in the process of the present invention.

In order to obtain satisfactory results, the catalyst used should be an amine having a $pK_b$ value of about 9.20 to 6.0. Also, the best results are obtained using the secondary or tertiary aniline derivatives such as the N-alkyl and N,N-dialkyl substituted anilines. The preferred aniline derivatives being N,N-dimethylaniline, N,N,2,4-tetramethylaniline, N,N,3,5-tetramethylaniline, N,N-dimethyl-o-toluidine, N,N-dimethyl-m-toluidine, N,N-dimethyl-p-toluidine, N-methyl-N-phenylbenzylamine, and their corresponding N-ethyl and N,N-diethyl derivatives.

The $pK_b$ value is determined in accordance with the procedure set forth by N. F. Hall and M. R. Sprinkle, Journal of the American Chemical Society, 54, 3469(1932).

The importance of surface porosity of the carrier is illustrated by the following Table I. In each instance the carrier particles are treated with neat N,N-dimethyl-o-toluidine, which is the preferred amine. One amine treated carrier particle is then added to 5 drops of isobutyl 2-cyanoacrylate having a $SO_2$ content of about 20 parts per million, agitated, and then gelation time observed. The effectiveness of a porous carrier as opposed to one formed of a substantially impervious or nonporous material is immediately apparent on comparing the gel times.

TABLE I

EFFECT OF CARRIER ON GEL TIME USING
N,N-Dimethyl-p-toluidine [DMPT].

| Carrier | Characterization of Carrier | Gel Time in Seconds |
|---|---|---|
| None (The Cyanoacrylate is permitted to stand exposed to air without agitation or addition of amine) | No carrier | No gelation observed up to 20,000 sec. (5.6 hours) |
| None (The Cyanoacrylate is stirred with a clear glass rod for 30 seconds than permitted to stand exposed to air. No amine is added) | No carrier | No gelation observed up to 20,000 sec. (5.6 hours) |
| 1 drop DMPT added | NO carrier | Instantaneous |
| 1 Molecular Sieve bead, Type 13X, 8–10 mesh treated in manner of Example 1 | Porous | 50 sec. |

TABLE I-Continued

EFFECT OF CARRIER ON GEL TIME USING
N,N-Dimethyl-p-toluidine [DMPT].

| Carrier | Characterization of Carrier | Gel Time in Seconds |
|---|---|---|
| Glass Beads, 3 mm, wetted with DMPT. | Nonporous | Substantially instantaneous polymerization with encapsulation |
| Glass Rod (wetted on one end, excess removed by touching to walls of container) | Nonporous | Instantaneous polymerization with encapsulation. |
| Quartz Chips (40–55 mg. with wetted film of DMPT on surface) | Nonporous | Substantially instantaneous polymerization with encapsulation |
| Birch wood (applicator stick, 2 mm diameter, one end soaked in DMPT, then wiped dry on surface) | Porous | 43 sec. |
| Clay Plate Chips (No amine) | Porous | No gelation within ¾ hour |
| Clay Plate Chips (DMPT impregnated for 2 min. and wiped dry) | Porous | 27 sec. |
| Micro-Porous Boiling Chips (Todd Scientific Company; soaked 2 minutes in DMPT, removed and wiped dry) | Porous | 195 sec. |
| Activated Carbon Granules, 12–40 mesh (Soaked in DMPT 2 min., surface blotted dry) | Porous | 125 sec. |

In like manner, the importance of the type of amine used with respect to the results obtained is well illustrated by the data set forth in Table II, wherein the carrier in each instance is the preferred particulate carrier, namely Type 13X molecular sieve beads having a pore diameter of 10A and a particle size of 8 × 12 mesh. Using different amines, the beads were impregnated with amine in the manner described in Example I. Using beads impregnated with the different amines, the effectiveness of each bead was evaluated by adding it, with agitation, to 5 drops of isobutyl 2-cyanoacrylate and the elapsed time from addition to gelation time observed. The cyanoacrylate, as in Table I, contained about 20 parts per million $SO_2$; and in both Table I and Table II, the amine containing particle was removed where polymerization had not yet occurred within thirty seconds after its addition to the monomer.

TABLE II

EFFECT OF AMINE ON POLYMERIZATION
OF ISOBUTYL 2-CYANOACRYLATE MONOMER
USING MOLECULAR SIEVE CARRIER

| Amine | Gel Time in Seconds |
|---|---|
| Aniline | >5000 sec. |
| N-Methylaniline | 3600 sec. |
| N,N-Dimethylaniline | 185 sec. |
| N,N,2,4-Tetramethylaniline | 1520 sec. |
| N,N,3,5-Tetramethylaniline | 75 sec. |
| N,N-Dimethyl-o-toluidine | 1550 sec. |
| N,N-Dimethyl-m-toluidine | 75 sec. |
| N,N-Dimethyl-p-toluidine | 50 sec. |
| N-Methyl-N-phenylbenzylamine | 2000 sec. |
| 2-Anilinoethanol | 4920 sec. |
| N,N-Dimethyl-1-naphthylamine | 3370 sec. |
| N,N,N',N'-Tetramethyl-o-phenylenediamine | 1400 sec. |
| o-Anisidine | >5000 sec. |
| Piperidine | Instantaneous |
| N-Methylpiperidine | Instantaneous |
| Pyridine | Instantaneous |
| 3,5-Dimethylpyridine | Instantaneous |
| n-Propylamine | Instantaneous |
| N,N,N',N'-Tetramethylethylenediamine | Instantaneous |
| 1,1,4,4-Tetramethyl-1,4-butanediamine | Instantaneous |
| Triethylamine | Instantaneous |

Two preferred procedures for impregnation of molecular sieve beads with N,N-dimethyl-p-toluidine (DMPT) are shown in Examples I and II.

EXAMPLE I.

Maximum Loadings of Catalyst on Molecular Sieves

A weighed quantity of molecular sieve beads is covered with neat N,N-dimethyl-p-toluidine and, after the exotherm has subsided, it is allowed to stand at room temperature for several hours or overnight in a sealed container. The contents are suction-filtered to recover unused DMPT catalyst, and the amine-saturated beads are blotted dry with absorbent paper towels to remove excess surface amine. The amine-uptake of the catalyst beads can be estimated from the percent weight gain of the beads. The actual amine content on the beads is determined by titration of a methanol extract of an accurately weighed quantity of treated beads with 0.1 N hyrochloric acid, using thymol blue (0.3%w in methanol) as indicator. Amine content is calculated from the following formula $$\% w\ DMPT = \frac{ml.\ titrants \times Normality \times 13.52}{Sample\ weight,\ in\ grams}$$

lar

EXAMPLE II

Loading of Less than Maximum Catalyst Concentrations on Molecular Sieves

A weighed quantity of molecular sieve beads is added to reagent grade acetone as the diluent. After the exotherm has subsided, a weighed quantity of DMPT is added and the beads and solution concentrated slowly on a rotating evaporator to remove the solvent. Evaporation in vacuo at the ambient temperature is continued until the beads assume a dry surface appearance and are of constant weight. The percent by weight of DMPT impregnated in the beads can be estimated from the weight increase of the beads or determined more accurately by volumetric titration with standardized hydrochloric acid as in the procedure described in Example I.

Examples of the results obtained through both these proocedures are set forth in the following Table III.

TABLE III

| Type Beads | Nominal Pore Diameter, °A | Quantity of Material Charged | | Bead Weight After DMPT Treatment | % Add-On | % DMPT by Assay |
|---|---|---|---|---|---|---|
| | | Beads | DMPT | | | |
| 8 × 12 mesh | 4 | 16.13g | 0.33g | 16.62g | 2.95 | 1.7–1.9 |
| 8 × 12 mesh | 4 | 19.80g | 0.20g | 21.81g | 9.2 | 8.8 |
| 8 × 12 mesh | 4 | 6.62g | excess | 8.30g | 20.7 | 20.0 |
| 8 × 12 mesh | 10 | 6.00g | excess | 8.92g | 32.7 | 24.6–27.6 |
| 4 × 8 mesh | 10 | 10.55g | excess | 15.21g | 30.6 | 31.7 |

To illustrate the reproducible gel times of this invention, the following examples are set forth in Table IV below. These results are obtained in the following manner:

Into an aluminum dish are added 5 drops (approx. 0.1 g) of the cyanoacrylate monomer. To this is added one DMPT-impregnated molecular sieve catalyst bead. The bead is stirred gently with a glass rod in the pool of monomer for 30 seconds. The bead is then removed. The time, in seconds, is measured from the introduction of the bead to the gelation point.

TABLE IV

| % DMPT in Bead | Gelation Time (seconds) for 100% Isobutyl 2-Cyanoacrylate (IBC) with ca 30 ppm SO$_2$ |
|---|---|
| 8.8% 4°A, 8 × 12 mesh | 347 |
| | 332 |
| | 361 |
| | 276 |
| | 372 |
| 15% 10°A, 8 × 12 mesh | 145 |
| | 134 |
| | 145 |
| | 167 |
| 24.6–27.6% 10°A, 8 × 12 mesh | 69 |
| | 79 |
| | 79 |
| | 80 |
| | 72 |

Generally, the individual pellet size of the molecular sieve material, based on the outer dimensions, e.g., diameter, suitably falls in the range of from about 56.6 to 0.523 mm$^3$. This is equivalent to molecular sieve beads which have a size of from 4 to 16 mesh. The preferred molecular sieve beads have a size of from 6 to 10 mesh.

As set forth above, a single bead having an 8 × 12 mesh size and impregnated with 25–30% by weight of DMPT and having a pore diameter of 10 Angstroms will be sufficient to catalyze 0.1 gram (approximately 5 drops) of monomer. For the most part this monomer to molecular sieve volume ratio will be linearly maintained for larger quantities of monomer. Therefore, three bands of the same size, bearing the same amount of catalyst, would be used to catalyze 0.3 grams monomer. Yet, because monomers differ in quantity of inhibitor they may contain it is difficult to precisely prescribe an exact number of pellets for catalyzing a given quantity of monomer. Therefore, a standardization procedure, as previously described, should preferably be used to determine the number of pellets which should be used to catalyze a given quantity of any particular monomer. To minimize the number of catalyzing particles employed per unit volume of monomer, it is convenient to reduce inhibitor concentration to as low a level as possible while still retaining sufficient inhibitor to impart a reasonable shelf-life to the monomer.

Although, in the preferred practice, molecular sieves are used in preparing the catalyzing particle, as previously indicated, the same can be in the form of a rod formed of wood. This is illustrated in the following Example III.

EXAMPLE III

Wood sticks (birch), measuring approximately 0.08 inch diameter × 6 inches length, are immersed in one end only in neat N,N-dimethyl-p-toluidine for 2 to 3 minutes. The sticks are then withdrawn and wiped dry on the surface with absorbent paper wipes.

Five (5) drops of isobutyl 2-cyanoacrylate monomer are measured into a small polyethylene or aluminum container. The catalyst treated end of a single applicator stick is stirred gently in the pool of monomer for 30 seconds and then withdrawn. The liquid monomer started to gel, followed rapidly by polymerization into a hard transparent mass within 20 seconds after removal of the catalyzing particle (stick), or within 50 seconds from the time the monomer was first contacted with the catalyzing particle.

When the catalyzing sticks are impregnated with N,N-dimethyl-m-toluidine and used in the same fashion, the isobutyl 2-cyanoacrylate monomer started to gel, followed rapidly by polymerization into a hard mass, within 45 seconds after removal of the catalyst particle (stick).

The process of the present invention, in which catalyzing particles are used for activating the cyanoacrylate monomer, is not limited to a liquid system wherein the catalyzing particle is added to fluid monomer alone, but the same may be used for activating the cyanoacrylate monomer where the same is heavily filled with small discrete particles so as to have a paste-like consistency, as where the same is used for highly-filled restoratives which may be used, for example, in the filling of tooth cavities. Where used with such paste-like consistency monomer-filler mixes, the catalyzing particle is inserted into the paste, the same mixed, the particle is then removed, and the activated paste is ready for use. This is illustrated in the following Example IV.

EXAMPLE IV 1.70 g (85% w) of a silane treated quartz filler (15–20 microns, median particle size) are blended with 0.30 g (15% w) isobutyl 2-cyanoacrylate and stirred until a smooth pasty consistency is obtained. To this is added one molecular sieve catalyzing particle (4 × 8 mesh, about 30% w N,N-dimethyl-p-toluidine content). The catalyst particle is stirred in the filled cyanoacrylate formulation for 60 seconds and then removed. The mass retains its pasty consistency for about 100 seconds after removal of the catalyst particles and then polymerizes rapidly into a hard composite.

From the foregoing description, it is apparent that the objects of this invention are achieved in a new and novel manner. From the foregoing description it will be apparent to those skilled in the art that alternatives to the specific embodiments illustrated can be practiced within the spirit and scope of the present invention.

The activated monomer, after removal of the catalyzing particle, may have numerous practical uses wherein advantage is taken of its ability to adhere to surfaces to which it is applied prior to gelation. For example, it can be used as a pit and fissure sealant wherein it is coated on the teeth to be protected and then strongly adheres to the same. It can also be used as an adhesive to adhere surfaces together. In such cases, the activated monomer would be used to wet both surfaces to be adhered and the surfaces pressed together prior to gelation and polymerization. The monomer would then polymerize in contact with the surfaces to form a strong cyanoacrylate bond between the same. Such bonding may be used by an orthodontist in the application of brackets and the like.

What is claimed is:

1. The method for the controlled anionic polymerization of a liquid cyanoacrylate monomer within a predictable time interval following initial contact of the monomer with a polymerization catalyst for the same, comprising admixing a catalyzing particle with said monomer, and then separating said catalyzing particle from said monomer prior to the gelation of said monomer, said catalyzing particle comprising a surface porous carrier impregnated with an amine catalyst having a pK$_b$ value of 9.2 to 6.0, of the group consisting of secondary and tertiary aniline derivatives whereby gelation of said monomer followed by polymerization of the same to a hard mass occurs within a predicted time period, thus providing a known period during which the catalyzed, but fluid, monomer can be applied to working surfaces prior to polymerization.

2. A method according to claim 1 wherein the amine catalyst is selected from the group consisting of N-alkyl and N,N-dialkyl-substituted anilines and wherein the alkyl group contains 1 to 4 carbons.

3. A method of claim 2 wherein the amine is selected from the group consisting of N,N-dimethylaniline, N,N,2,4-tetramethylaniline, N,N,3,5-tetramethylaniline, N,N-dimethyl-o-toluidine, N,N-dimethyl-m-toluidine, and N,N-dimethyl-p-toluidine, N-methyl-N-phenylbenzylamine, and their corresponding N-ethyl and N,N-diethyl derivatives.

4. A method of claim 3 in which the amine is N,N-dimethyl-p-toluidine.

5. A method of claim 1 wherein the monomer is a 2-cyanoacrylate ester selected from the group consisting of phenyl, cyclohexyl, and $C_1$ to $C_{16}$ alkyl esters.

6. A method according to claim 3 in which the porous carrier is a molecular sieve bead having a particle size of about 4 to 16 mesh.

7. A method according to claim 3 in which the porous carrier is in the form of a rod having a diameter of about 0.2 to 0.04 inches.

8. The method of claim 1 wherein after separation of said catalyzing particle and prior to gelation said monomer is coated on a surface and polymerizes while in contact with said surface.

9. The method of claim 1 wherein after separation of said catalyzing particle and prior to gelation of said monomer said monomer is placed on two separate surfaced so as to wet the same with said monomer and said two wetted surfaces are brought and held together while said monomer wetting said surfaces gels and polymerizes.

* * * * *

UNITED STATES PATENT OFFICE
CERTIFICATE OF CORRECTION

Patent No. 3,903,055　　　　　　　　　Dated　September 2, 1975

Inventor(s)　Carl J. Buck

It is certified that error appears in the above-identified patent and that said Letters Patent are hereby corrected as shown below:

Column 5, line 35, "o" should read -- p --.

Column 7, line 61, "hyrochloric" should read -- hydrochloric --.

Column 7, at bottom of page, delete "lar".

Column 8, line 21, "proocedures" should read -- procedures --.

Column 9, line 14, "bands" should read -- beads --.

Column 9, line 37, "immersed in" should read -- immersed on --.

Column 12, line 7, "surfaced" should read -- surfaces --.

Signed and Sealed this

Twenty-fifth Day of January 1977

[SEAL]

Attest:

RUTH C. MASON　　　　　　　　　C. MARSHALL DANN
*Attesting Officer*　　　　　　　*Commissioner of Patents and Trademarks*